US012707489B2

(12) United States Patent
Dutta et al.

(10) Patent No.: US 12,707,489 B2
(45) Date of Patent: Aug. 11, 2026

(54) RESOURCE EXCLUSION AND TRANSMISSIONS OVER SIDELINK WITH MULTI-TRP ENABLED UES

(71) Applicant: QUALCOMM Incorporated, San Diego, CA (US)

(72) Inventors: Sourjya Dutta, San Diego, CA (US); Shuanshuan Wu, San Diego, CA (US); Kapil Gulati, Belle Mead, NJ (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 97 days.

(21) Appl. No.: 17/319,227

(22) Filed: May 13, 2021

(65) Prior Publication Data

US 2021/0392652 A1 Dec. 16, 2021

Related U.S. Application Data

(60) Provisional application No. 63/037,850, filed on Jun. 11, 2020.

(51) Int. Cl.
*H04W 72/542* (2023.01)

(52) U.S. Cl.
CPC ................................ *H04W 72/542* (2023.01)

(58) Field of Classification Search
CPC ................................................ H04W 7248/085
See application file for complete search history.

(56) References Cited

U.S. PATENT DOCUMENTS

2019/0306923 A1 10/2019 Xiong et al.
2020/0007282 A1 1/2020 Yoon et al.
2020/0037343 A1 1/2020 He et al.
2020/0045655 A1 2/2020 Joseph et al.
2020/0059821 A1* 2/2020 Wirth .................. H04B 17/309
(Continued)

FOREIGN PATENT DOCUMENTS

WO WO-2020033088 A1 2/2020
WO WO-2020033622 A1 2/2020
WO 2020092931 A1 5/2020

OTHER PUBLICATIONS

International Search Report and Written Opinion—PCT/US2021/032611—ISA/EPO—Aug. 5, 2021.
(Continued)

*Primary Examiner* — Nishant Divecha
*Assistant Examiner* — Alan L Lindenbaum
(74) *Attorney, Agent, or Firm* — Patterson & Sheridan, LLP

(57) ABSTRACT

Certain aspects of the present disclosure provide a method for wireless communications by a user equipment (UE). The method generally includes taking received signal power measurements on a first transmitter receiver point (TRP) of the UE and a second TRP of the UE, determining resources to exclude from a pool of resources for sidelink transmissions based on the received signal power measurements taken on the first and second TRPs, selecting resources from the pool of resources for sidelink communications based at least in part on the determination of resources to exclude, and transmitting on the sidelink, on one or more of the first and second TRPs, using the selected resources.

28 Claims, 14 Drawing Sheets

(56) References Cited

U.S. PATENT DOCUMENTS

| | | | | |
|---|---|---|---|---|
| 2021/0314917 | A1* | 10/2021 | Lee | H04W 24/08 |
| 2022/0330038 | A1* | 10/2022 | Ganesan | H04W 16/28 |

OTHER PUBLICATIONS

LG Electronics: "Discussion on Sidelink Resource Allocation Mechanism", 3GPP TSG RAN WG1 Meeting #94, 3GPP Draft, R1-1808522 Discussion on Sidelink Resource Allocation Mechanism LG, 3rd Generation Partnership Project (3GPP), Mobile Competence Centre, 650, Route Des Lucioles, F-06921 Sophia-Antipolis Cedex, France, RAN WG1, No. Gothenburg, Sweden, Aug. 20, 2018-Aug. 24, 2018, Aug. 11, 2018 (Aug. 11, 2018), 4 Pages, XP05151590, Retrieved from the Internet: URL: https://www.3gpp.org/ftp/TSG_RAN/WG1_RL1/TSGR1_94/Docs/R1-1808522.zip, [retrieved on Aug. 11, 2018], The whole document.

QUALCOMM Incorporated: "Sidelink Resource Allocation Mechanism for NR V2X", 3GPP TSG-RAN WG1 #98bis, R1-1913293, Nov. 18- 22, 2019. Reno, USA, Nov. 20, 2019, 10 Pages.

* cited by examiner

1002

TAKE RECEIVED SIGNAL POWER MEASUREMENTS ON A FIRST TRANSMITTER RECEIVER POINT (TRP) OF THE UE AND A SECOND TRP OF THE UE

1004

DETERMINE CANDIDATE RESOURCES A POOL OF RESOURCES FOR SIDELINK TRANSMISSIONS BASED ON THE RECEIVED SIGNAL POWER MEASUREMENTS TAKEN ON THE FIRST AND SECOND TRPS

1006

SELECT RESOURCES FROM THE SET OF CANDIDATE RESOURCES FOR SIDELINK COMMUNICATIONS

1006

TRANSMIT ON THE SIDELINK, VIA AT LEAST OF THE FIRST TRP OR SECOND TRP, USING THE SELECTED RESOURCES

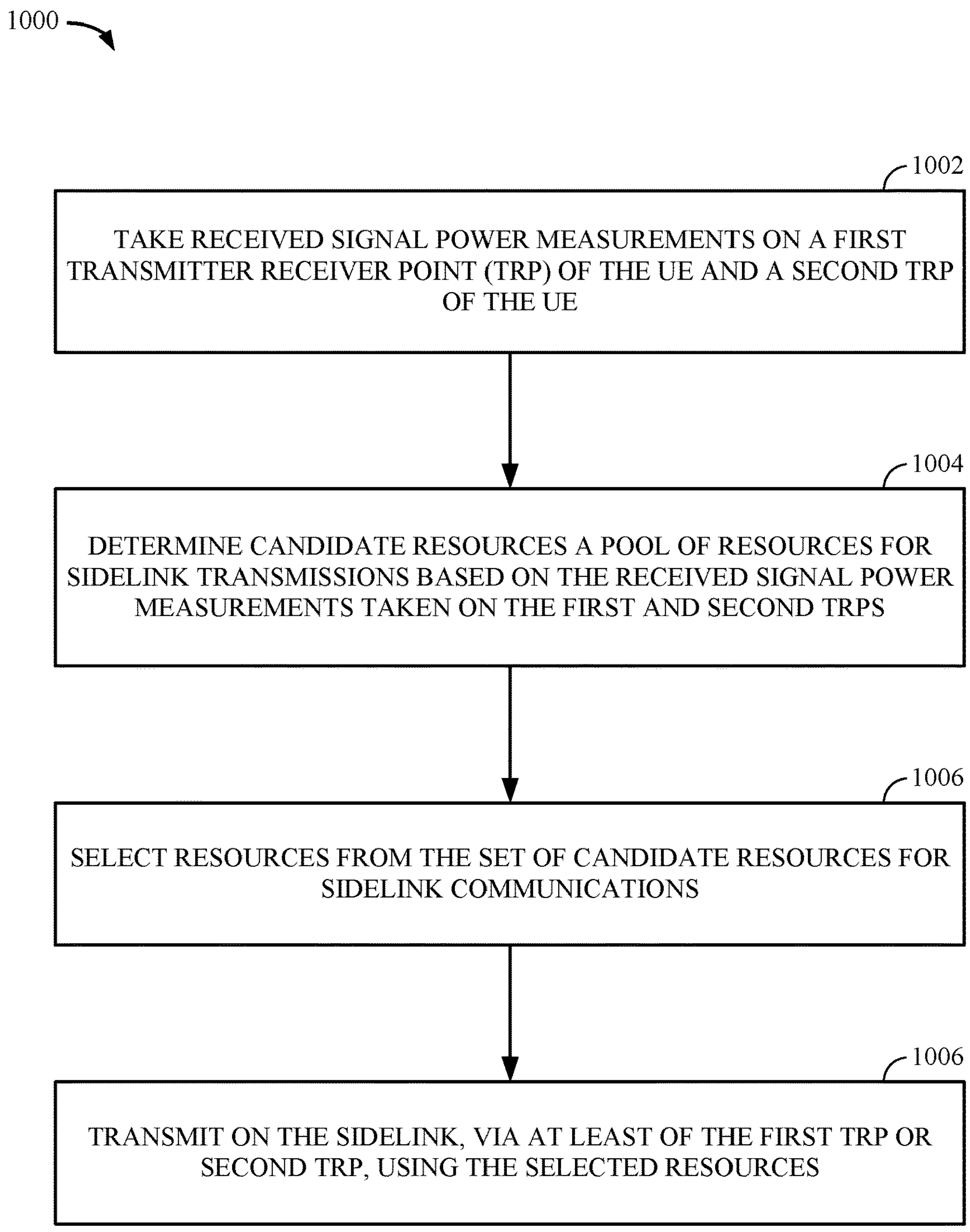

RECEIVE ONE OR MORE SIDELINK CONTROL INFORMATIONS (SCIS) INDICATING RESOURCES FOR A SIDELINK TRANSMISSION JOINTLY SCHEDULED ON FIRST AND SECOND TRANSMITTER RECEIVER POINTS (TRPS) OF A TRANSMITTER UE

1104

MONITOR THE INDICATED RESOURCES FOR THE SIDELINK TRANSMISSION

RESOURCE EXCLUSION AND TRANSMISSIONS OVER SIDELINK WITH MULTI-TRP ENABLED UES

CROSS REFERENCE TO RELATED APPLICATION

This Application hereby claims priority under 35 U.S.C. § 119 to U.S. Provisional Patent Application No. 63/037,850, filed on Jun. 11, 2020, the contents of which are incorporated herein in their entirety.

FIELD OF THE DISCLOSURE

Aspects of the present disclosure relate to wireless communications, and more particularly, to device-to-device sidelink communication.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communications by a user equipment (UE). The method generally includes taking received signal power measurements on a first transmitter receiver point (TRP) of the UE and a second TRP of the UE, determining a set of candidate resources from a pool of resources for sidelink transmissions based on the received signal power measurements taken on the first and second TRPs, selecting resources from the set of candidate resources for sidelink communications, and transmitting on the sidelink via at least one of the first TRP or the second TRP by using the selected resources.

Certain aspects of this disclosure provide a method for wireless communications by a receiver UE. The method generally includes receiving one or more sidelink control informations (SCIs) indicating resources for a sidelink transmission jointly scheduled on first and second transmitter receiver points (TRPs) of a transmitter UE and monitoring the indicated resources for the sidelink transmission.

Certain aspects of this disclosure provide a user equipment (UE). The UE generally includes means for taking received signal power measurements on a first transmitter receiver point (TRP) of the UE and a second TRP of the UE, means for determining a set of candidate resources from a pool of resources for sidelink transmissions based on the received signal power measurements taken on the first and second TRPs, means for selecting resources from the set of candidate resources for sidelink communications, and means for transmitting on the sidelink via at least one of the first TRP or the second TRP by using the selected resources.

Certain aspects of this disclosure provide a receiver user equipment (UE). The receiver UE generally includes means for receiving one or more sidelink control informations (SCIs) indicating resources for a sidelink transmission jointly scheduled on first and second transmitter receiver points (TRPs) of a transmitter UE and means for monitoring the indicated resources for the sidelink transmission.

Certain aspects of this disclosure provide a user equipment (UE). The UE generally includes a processing system configured to take received signal power measurements on a first transmitter receiver point (TRP) of the UE and a second TRP of the UE, determine a set of candidate resources from a pool of resources for sidelink transmissions based on the received signal power measurements taken on the first and second TRPs, and select resources from the set of candidate resources for sidelink communications, and a transmitter configured to transmit on the sidelink via at least one of the first TRP or the second TRP by using the selected resources.

Certain aspects of this disclosure provide a receiver user equipment (UE). The receiver UE generally includes a receiver configured to receive one or more sidelink control informations (SCIs) indicating resources for a sidelink transmission jointly scheduled on first and second transmitter receiver points (TRPs) of a transmitter UE and a processing system configured to monitor the indicated resources for the sidelink transmission.

Certain aspects of this disclosure provide an apparatus for wireless communications by a user equipment (UE). The apparatus generally includes a processing system configured to take received signal power measurements on a first transmitter receiver point (TRP) of the UE and a second TRP of the UE, determine a set of candidate resources from a pool of resources for sidelink transmissions based on the received signal power measurements taken on the first and second TRPs, and select resources from the set of candidate resources for sidelink communications, and an interface configured to output data for transmission on the sidelink via at least one of the first TRP or the second TRP by using the selected resources.

Certain aspects of this disclosure provide an apparatus for wireless communications by a receiver user equipment (UE). The apparatus generally includes an interface configured to obtain one or more sidelink control informations (SCIs) indicating resources for a sidelink transmission jointly scheduled on first and second transmitter receiver points (TRPs) of a transmitter UE and a processing system configured to monitor the indicated resources for the sidelink transmission.

Certain aspects of this disclosure provide a computer-readable medium for wireless communications by a user equipment (UE). The computer-readable medium generally includes instructions executable by the UE to receive one or more sidelink control informations (SCIs) indicating resources for a sidelink transmission jointly scheduled on first and second transmitter receiver points (TRPs) of a transmitter UE and monitor the indicated resources for the sidelink transmission.

Certain aspects of this disclosure provide a computer-readable medium for wireless communications by a receiver user equipment (UE). The computer-readable medium generally includes instructions executable by the receiver UE to take received signal power measurements on a first transmitter receiver point (TRP) of the UE and a second TRP of the UE, determine a set of candidate resources from a pool of resources for sidelink transmissions based on the received signal power measurements taken on the first and second TRPs, select resources from the set of candidate resources for sidelink communications, and transmit on the sidelink via at least one of the first TRP or the second TRP by using the selected resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 10 illustrates example operations for wireless communications by a transmitter UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
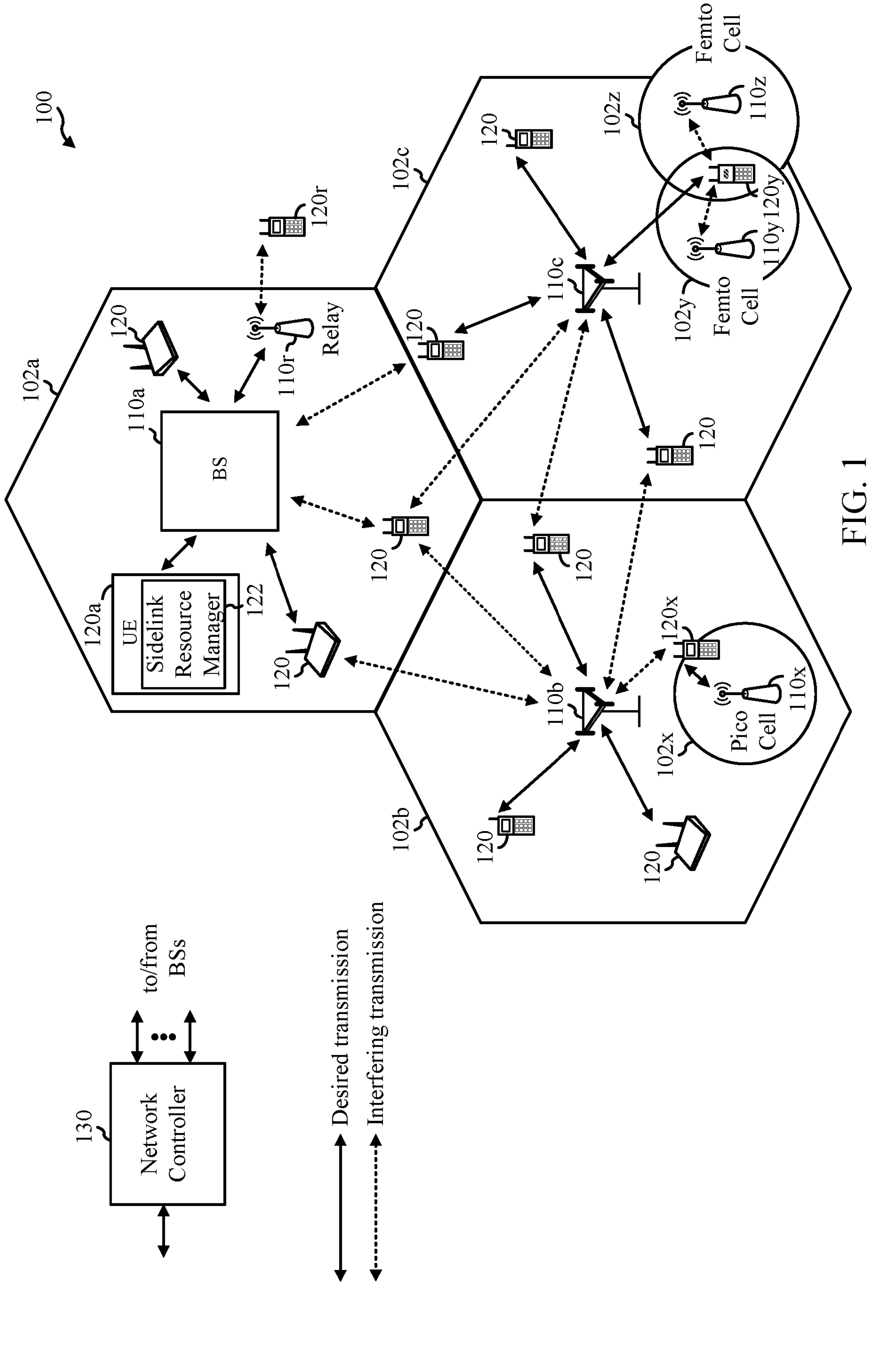
FIG. 1 is a block diagram conceptually illustrating an example telecommunications system, in accordance with certain aspects of the present disclosure.

Aspects of the present disclosure provide apparatus, methods, processing systems, and computer readable mediums for resource exclusion and selection for sidelink transmissions by a multi-TRP (mTRP) enabled UE. As will be described in greater detail below, for an mTRP UE, the resource exclusion for transmissions may consider RSRP measured on all TRPs. The techniques proposed herein may decrease latency and increase reliability in sidelink communications, such as vehicle to everything (V2X), by effectively taking advantage of enhanced hardware capabilities available in mTRP UEs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Figure 11:
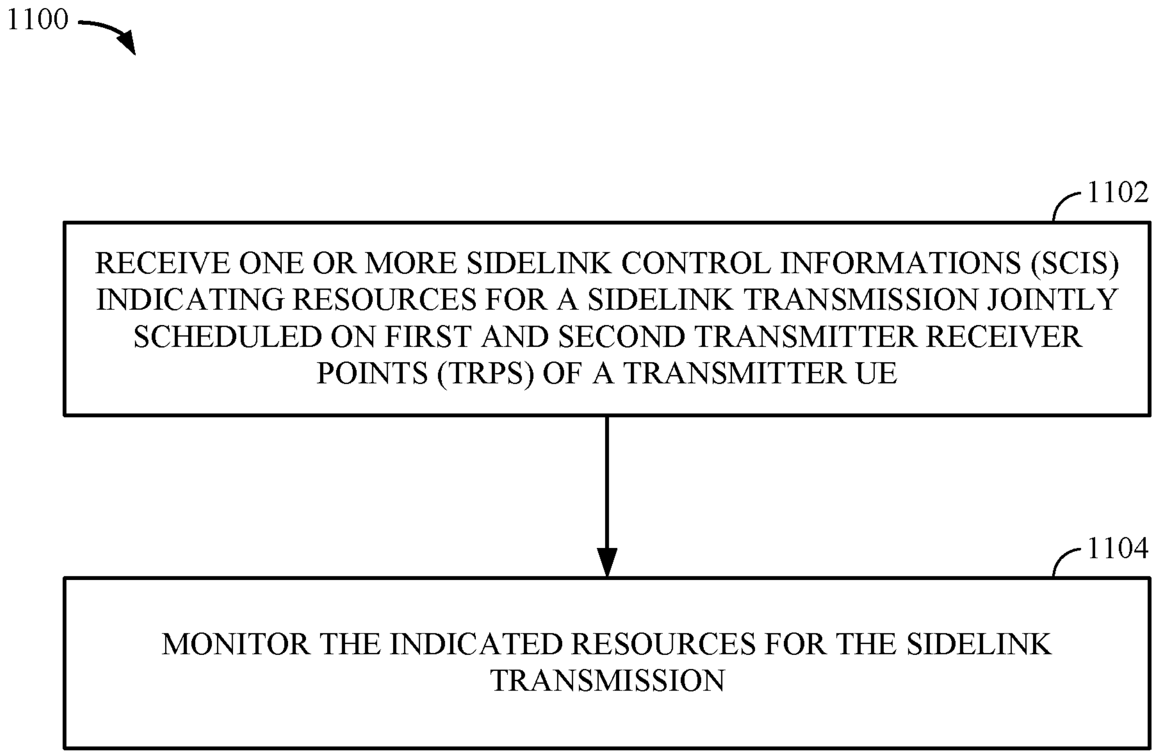
FIG. 11 illustrates example operations for wireless communications by a receiver UE, in accordance with certain aspects of the present disclosure.

FIG. 1 illustrates an example wireless communication network 100 in which aspects of the present disclosure may be performed. For example, one or more UEs 120 of FIG. 1 may be mTRP UEs with a sidelink resource manager 122 configured to perform operations described below with reference to FIG. 10 to determine resources to use for sidelink transmissions. Similarly, one or more UEs could be configured to perform operations 1100 of FIG. 11 to process sidelink transmissions (from an mTRP UE performing operations 1000 of FIG. 10).

As illustrated in FIG. 1, the wireless communication network 100 may include a number of base stations (BSs) 110*a-z* (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. ABS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
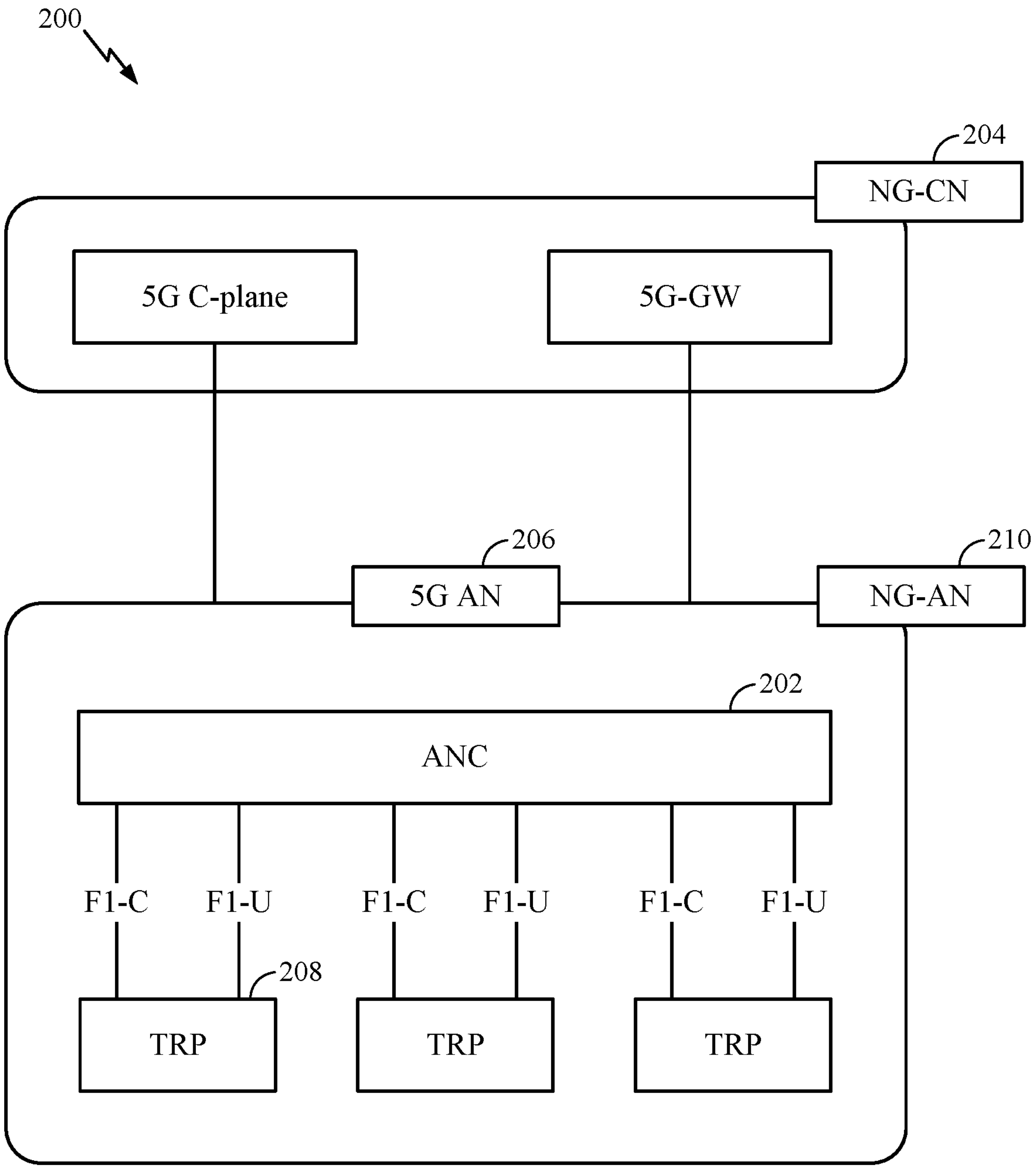
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
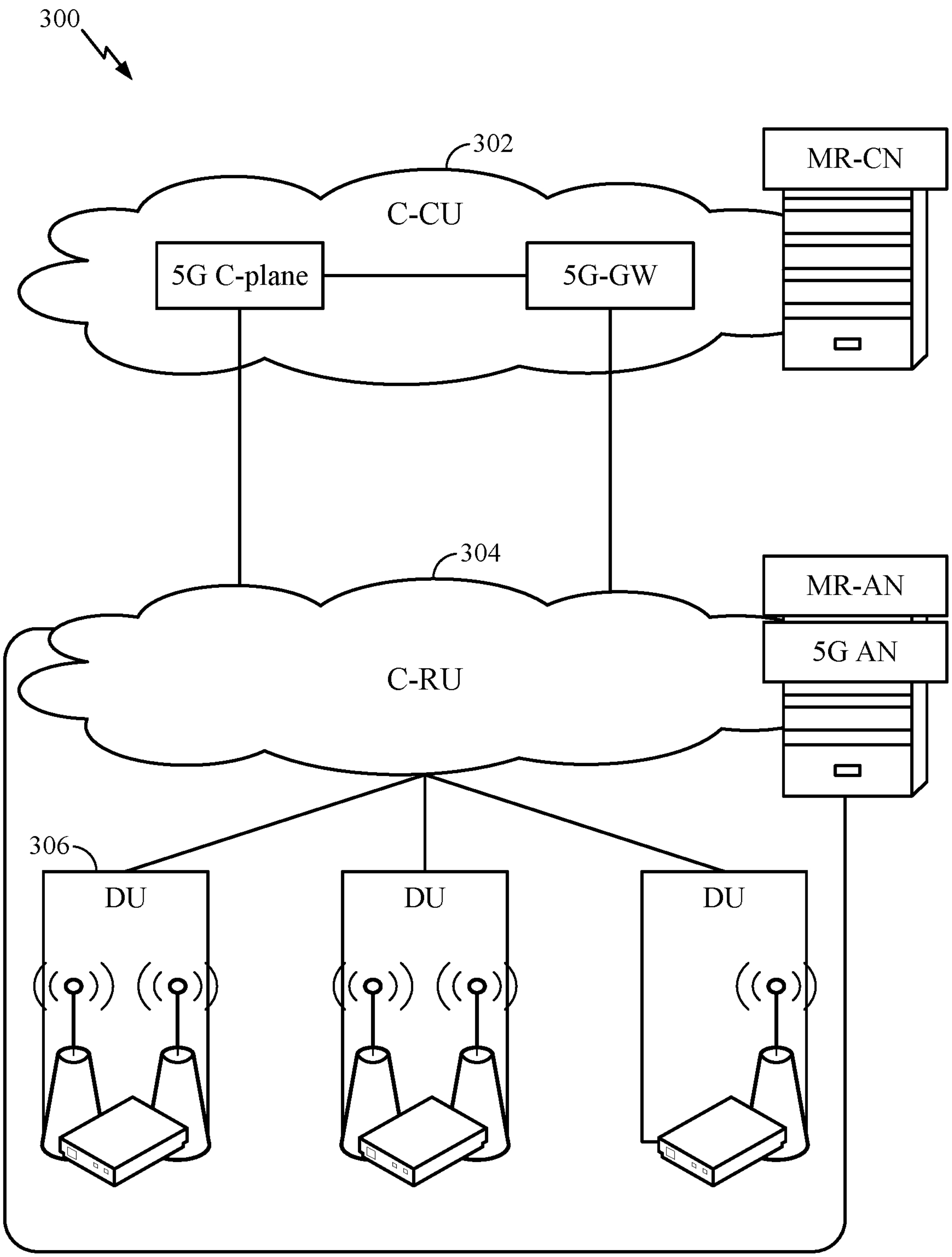
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
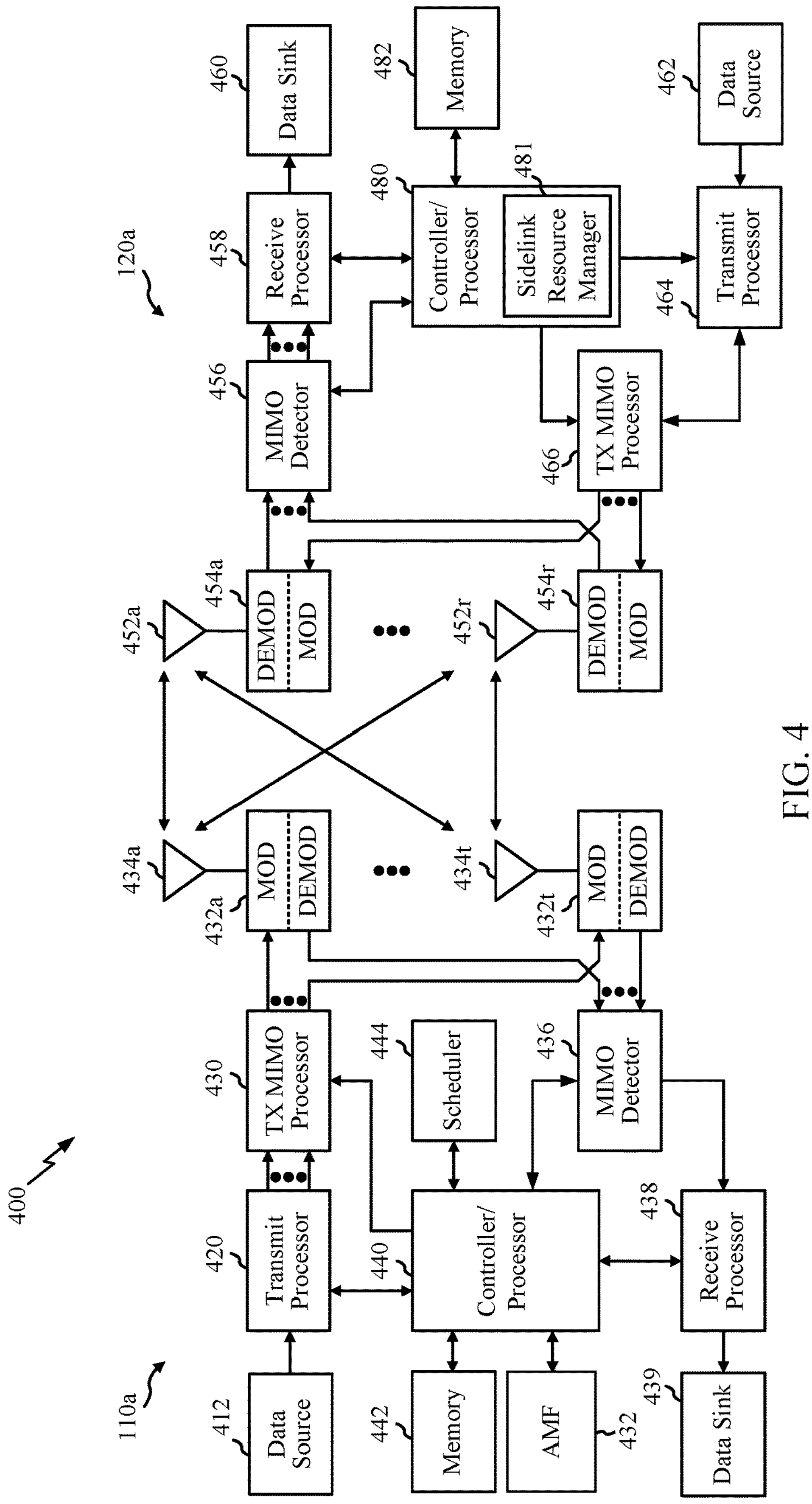
FIG. 4 is a block diagram conceptually illustrating a design of an example base station (BS) and user equipment (UE), in accordance with certain aspects of the present disclosure.

FIG. 4 illustrates example components of BS 110*a* and UE 120*a* (as depicted in FIG. 1), which may be used to implement aspects of the present disclosure. For example, antennas 452, processors 466, 458, 464, and/or controller/processor 480 of the UE 120*a* may be used to perform the various techniques and methods described herein with reference to FIG. 10.

At the BS 110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120*a*, the antennas 452*a* through 452*r* may receive the downlink signals from the base station 110*a* and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110*a*. At the BS 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. The processor 440 and/or other processors and modules at the BS 110*a* may perform or direct the execution of processes for the techniques described herein. As shown in FIG. 4, the controller/processor 480 of the UE 120*a* has a sidelink manager 481 that may be configured for perform operations 1000 of FIG. 10 and/or operations 1100 of FIG. 11.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5B:
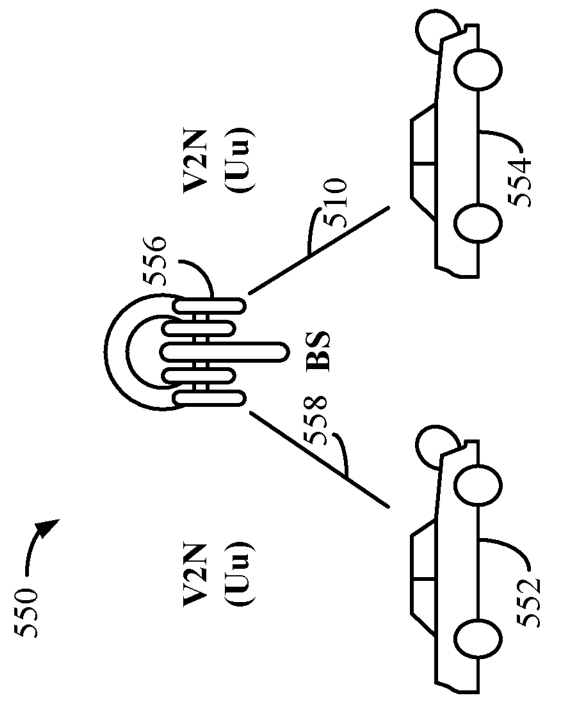
FIGS. 5A and 5B show diagrammatic representations of example vehicle to everything (V2X) systems in accordance with some aspects of the present disclosure.
Figure 5A:
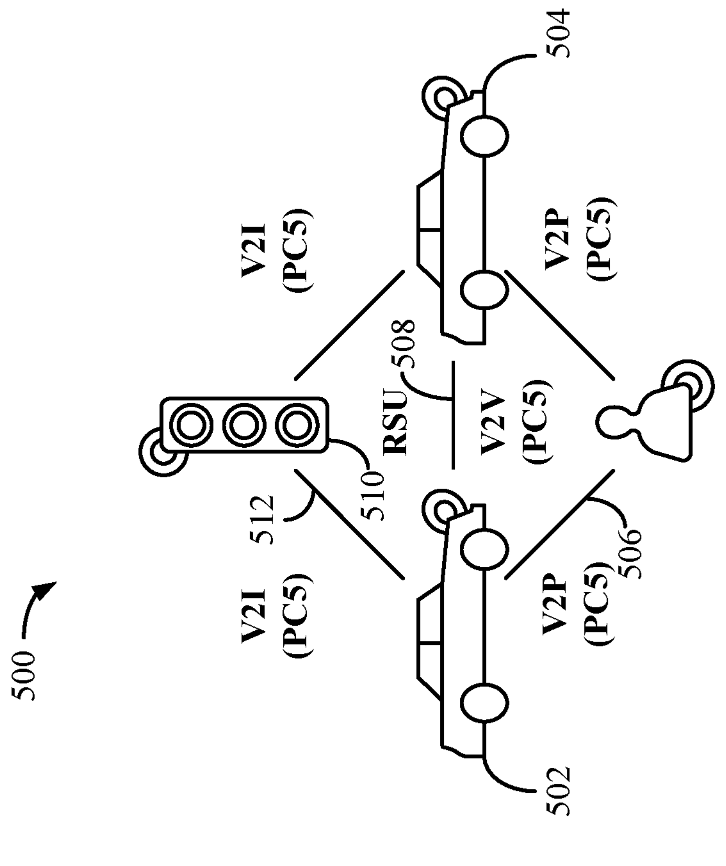

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V21)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
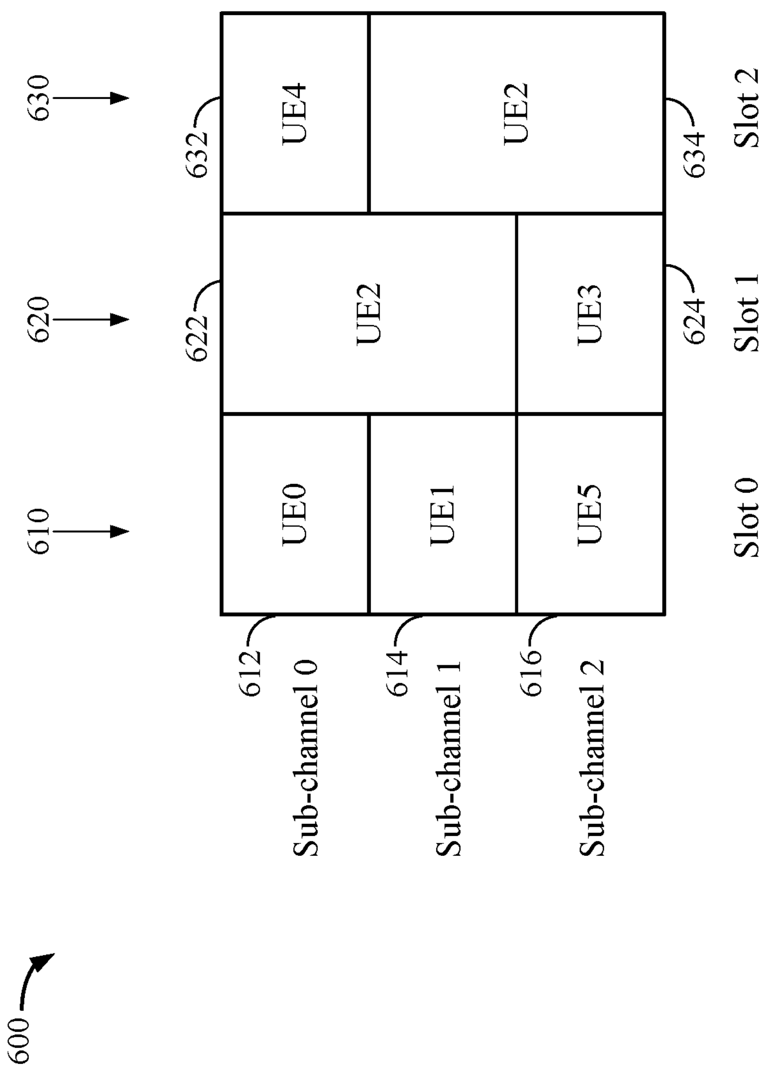
FIG. 6 illustrates an example allocation of a resource pool for sidelink communications, in accordance with certain aspects of the present disclosure.

FIG. 6 is an example of how resources of a common resource pool 600 may be allocated for sidelink communications (broadcast and groupcast device-to-device or D2D) between UEs (e.g., UEs 110, shown in FIG. 1). As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. Thus, UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2. In aspects of the present disclosure, a sidelink transmission(s) that cannot be received may be referred to as being "erased" for the UE or wireless node that cannot receive the sidelink transmission, because the UE has no information regarding that sidelink transmission. This is unlike other situations in which a UE fails to decode a transmission, because in those situations, the UE may retain some information regarding the transmission that the UE failed to decode, and the UE may combine that retained information with a retransmission that the UE receives to determine the transmission that the UE failed to decode.

According to previously known techniques, resource allocation is reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI). In the previously known techniques, sidelink control information (SCI) may be transmitted in two stages. A first stage SCI (SCI-1) may be transmitted on a physical sidelink control channel (PSCCH) and contains resource reservation information as well as information needed to decode a second stage SCI (SCI-2). A SCI-2 may be transmitted on the physical sidelink shared channel (PSSCH) and contains information needed to decode data on the shared channel (SCH) and to provide feedback (e.g., acknowledgments (ACKs) or negative acknowledgments (NAKs)) over the physical sidelink feedback channel (PSFCH).

Figure 7:
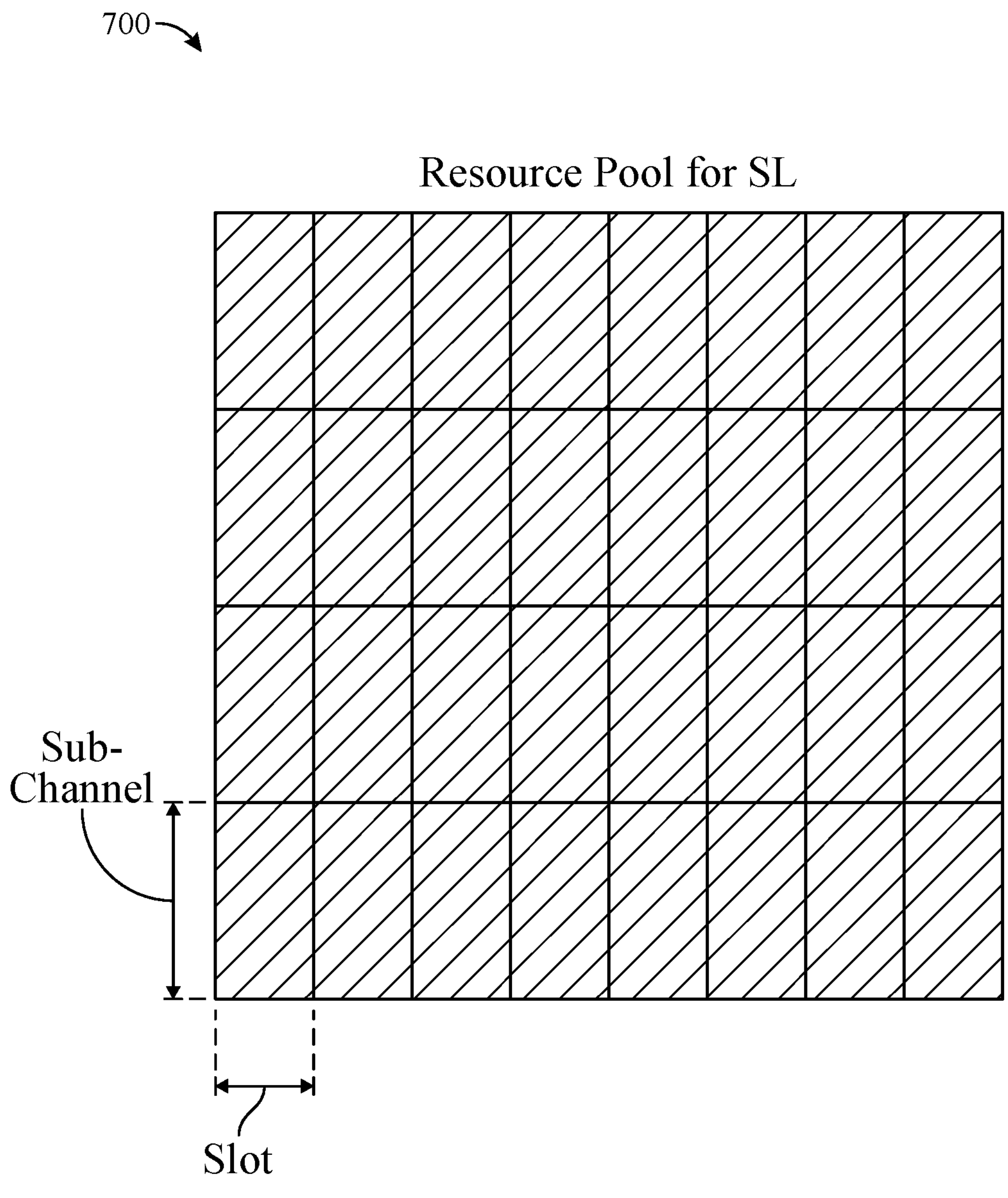
FIG. 7 is an example resource pool for sidelink communication.

FIG. 7 is an example resource pool 700 for sidelink communication. As illustrated, the minimum resource allocation unit is a sub-channel in the frequency domain (i.e., as shown in they axis) and the resource allocation in the time domain is a slot (i.e., as shown in the x axis). For example, depending on subcarrier spacing (SCS) values, and depending on whether a normal cyclic prefix (CP) or an extended CP is used, a slot in the time domain may include 12 or 14 orthogonal frequency division multiplexing (OFDM) symbols.

In the frequency domain, each subchannel may include a set number of consecutive resource blocks (RBs), which may include 12 consecutive subcarriers with the same SCS, such as 10, 15, 20, 25 . . . etc. consecutive RBs depending on practical configuration. Hereinafter, each unit of resource in one slot and in one subchannel is referred to as a resource, or resource unit. For a certain resource pool, the resources therein may be referred to using the coordinates of the slot index (e.g., the $n^{th}$ slot in the x axis of the time domain) and the subchannel index (e.g., the $m^{th}$ subchannel in the y axis of the frequency domain). Interchangeably, the slot index may be referred to as the time index; and the subchannel index may be referred to as the frequency index.

Figure 8:
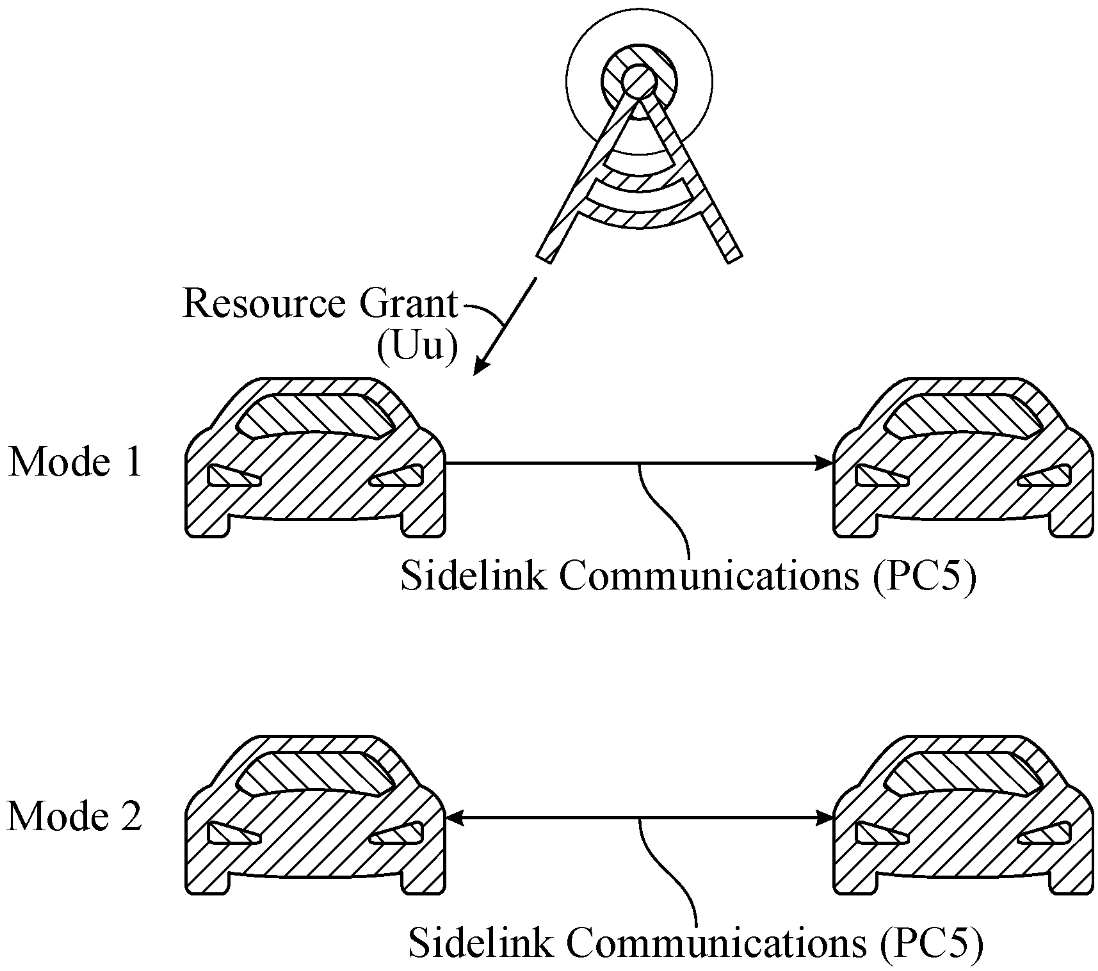
FIG. 8 illustrates two modes of sidelink communication.

FIG. 8 illustrates two modes of resource allocation for sidelink communications, Mode 1 and Mode 2.

In Mode 1 sidelink communication, the sidelink resources are often scheduled by a gNB. In Mode 2 sidelink communication, the UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

In Mode 2, when traffic arrives at a transmitting UE, the transmitting UE may select resources for PSCCH and PSSCH, and/or reserve resources for retransmissions to minimize latency. Therefore, in conventional configurations the transmitting UE would select resources for PSSCH associated with PSCCH for initial transmission and blind retransmissions, which incurs unnecessary resources and the related power consumption. To avoid such resource waste and other similar resource duplication/blind reservation/redundancy, the UEs in sidelink communication may communicate, as shown in FIG. 9, to use a subset of the resources.

Example Resource Exclusion and Transmissions Over Sidelink with mTRP Enabled UEs Aspects of the present disclosure provide techniques for resource exclusion and selection for sidelink transmissions by multi-TRP (mTRP) enabled UEs. As will be described in greater detail below, techniques provide for resource exclusion for transmissions that considers RSRP measured on all TRPs. The techniques proposed herein may decrease latency and increase reliability in sidelink communications, by effectively taking advantage of enhanced hardware capabilities available in mTRP UEs.

Some vehicles may have two or more transmitter-receiver points (TRP). For example, a car may have front and read antenna panels. Larger vehicles, like trucks and trailers, may have multiple TRPs. In such cases, the TRPs on the same vehicle may be separated by considerable distance (e.g., 3~4 m for a car or 20 m or more for an 18-wheeler truck and trailer).

Figure 9:
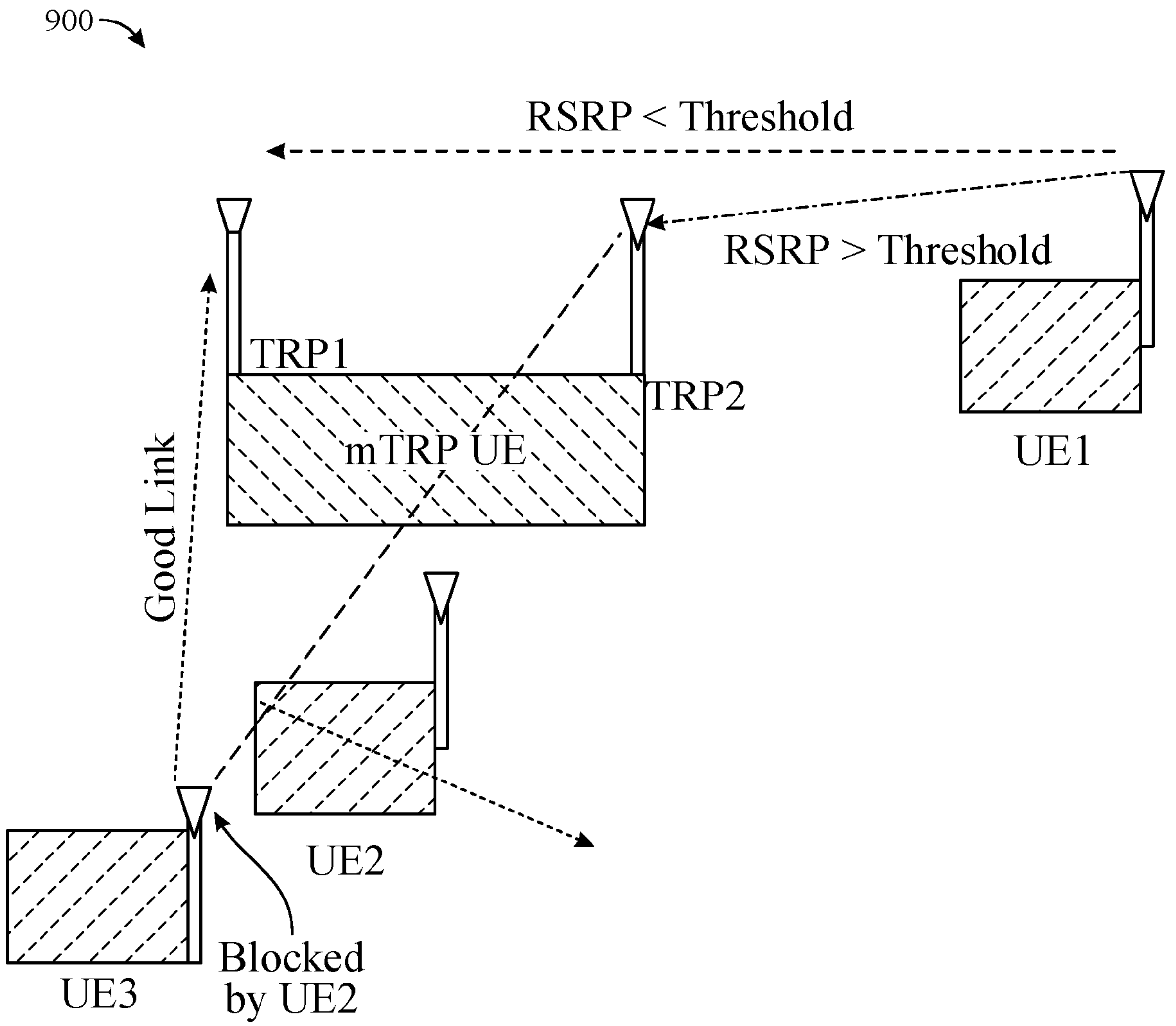
FIG. 9 illustrates an example sidelink scenario with a multiple transmitter receiver point (mTRP) enabled UE, in which aspects of the present disclosure may be utilized.

FIG. 9 illustrates how each of the TRPs (TRP1 and TRP2) of an mTRP UE views the sidelink communication channels differently. Transmitting with mTRP UEs, each TRP will have different reference signal received power (RSRP) measurements from the same peer UE. This can be due to the difference of distance, line of sight (LoS) versus non line of sight (NLoS) channel, blocking, and the like.

In the example illustrated in FIG. 9, TRP1 has a good link to UE3, but TRP2 does not have a good link to UE3 due to blocking by UE2. TRP2 sees a stronger RSRP (RSRP>Threshold) from UE1, while TRP1 sees a weaker RSRP (RSRP<Threshold) from UE1 due to the greater distance.

Current standard specifications lack special provisions for mTRP transmissions. As a result, the hardware capabilities of mTRP UEs may be underutilized for sidelink communications. Different TRPs will have different channels to peer UEs and, hence, they will have different RSRP observed from the same peer on different TRPs (as in the example of FIG. 9).

Aspects of the present disclosure, however, may take advantage of this observation to better utilize network resources by transmitting different signals or signal power from different TRPs. The techniques presented herein propose techniques for efficient multi-TRP transmission based on self-measurements (e.g., by transmitting on one TRP while receiving on the other). RSRP measurements on different time-frequency resources on different TRPs will be different. Further, mTRP UEs may also have different assumptions on interference between its own TRPs.

Resource exclusion for transmissions may consider RSRP measured on all TRPs for efficient resource selection. Resource exclusion generally refers to identifying certain resources from the sidelink resource pool that are not suitable for transmissions (e.g., due to excessive interference or reservation by other UEs). Resource exclusion may also consider resources reserved by other UEs (e.g., as indicated in SCI). The techniques presented herein, however, allow for resource exclusion when multiple TRPs are present at the transmitter. Resource exclusion and selection may also be optimized for faster retransmissions or concurrent transmissions when multiple TRPs are present at the transmitter.

FIG. 10 illustrates example operations 1000 for wireless communications by a transmitter UE, in accordance with certain aspects of the present disclosure. For example, operations 1000 may be performed by an mTRP UE 120 of FIG. 1 or FIG. 4 when performing sidelink communications with another UE (that may or may not be mTRP enabled).

Operations 1000 begin, at 1002, by taking received signal power measurements on a first transmitter receiver point (TRP) of the transmitter UE and a second TRP of the transmitter UE. At 1004, the transmitter UE determines candidate resources from a pool of resources for sidelink transmissions based on the received signal power measurements or determines taken on the first and second TRPs or determines resources to exclude from the pool of resources for sidelink transmissions based on the received signal power measurements taken on the first and second TRPs. At 1006, the transmitter UE selects resources from the set of candidate resources for sidelink communications or selects resources from the pool of resources for sidelink communications based at least in part on the determination of resources to exclude. At 1008, the transmitter UE transmits on the sidelink, via at least one of the first TRP or second TRP, using the selected resources.

FIG. 1100 illustrates example operations 1100 for wireless communications by a receiver UE and may be considered complementary to operations 1000 of FIG. 10. For example, operations 1100 may be performed by a UE 120 of FIG. 1 or FIG. 4 to receive and process sidelink transmissions sent by an mTRP UE performing operations 1000 of FIG. 10.

Operations 1100 begin, at 1102, by receiving one or more sidelink control informations (SCIs) indicating resources for a sidelink transmission jointly scheduled on first and second transmitter receiver points (TRPs) of a transmitter UE. At 1104, the receiver UE monitors the indicated resources for the sidelink transmission.

As noted above, resource exclusion generally refers to identifying certain resources from the sidelink resource pool that are not suitable for transmissions. By definition, remaining resources (not available) may be considered available for sidelink transmissions. One approach for a UE with m TRPs is to consider a time-frequency resource available (only) if the (interference) RSRP measured by each TRP on that resource is below a threshold value:

$$\max(RSRP_1, RSRP_2, \ldots RSRP_m) \le \rho_{thresh}.$$

According to this approach, a time-frequency resource is considered as excluded if it does not meet this condition.

According to the joint scheduling proposed herein, however, sidelink transmissions may be performed with only one or a subset of TRPs, with consideration of the resource exclusion (and resource availability) at all TRPs. In other words, because different TRPs may observe different channels, different resources may be available for transmission on different TRPs. As a result, the techniques proposed herein may make more efficient use of network resources.

Figure 12:
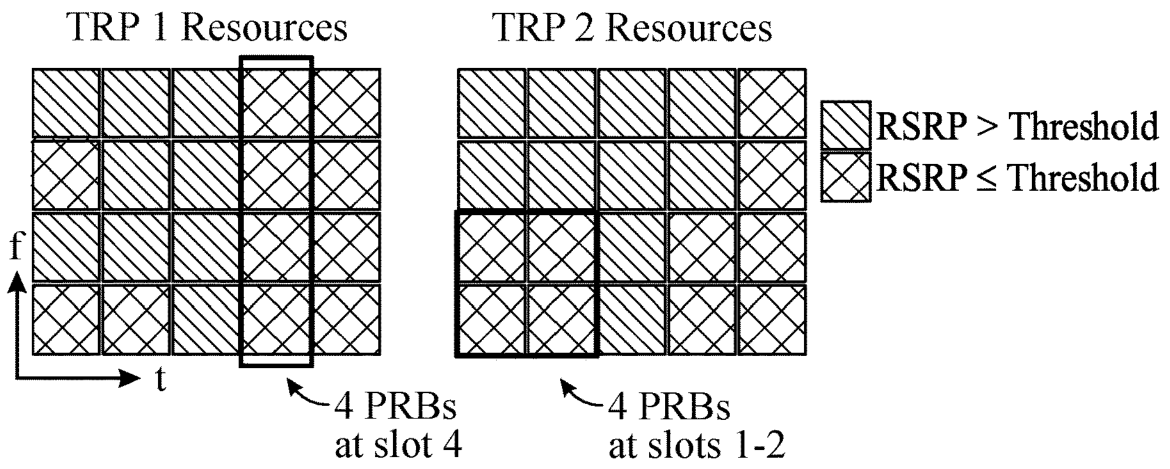
FIGS. 12-14 illustrate example sidelink resource exclusion and selection for an mTRP enabled UE, in accordance with certain aspects of the present disclosure.

For example, FIG. 12 illustrates the RSRP observed on each time/frequency resource by TRP1 and TRP2 of an mTRP UE. The RSRP observed on each resource by each TRP may be determined, for example, based on self-measurement (e.g., performed while transmitting on one TRP while measuring RSRP for different time/frequency resources on the other). For illustrative purposes, physical resource blocks (PRBs) are shown with cross-hatching to indicate resources (PRBs) that are excluded (RSRP greater than a threshold value) while PRBs are shown with solid blocks to indicate available resources (RSRP less than or equal to the threshold value).

In case transmission is performed on a single TRP, the TRP selected to transmit may be the TRP with the earliest available resources sufficient for the transmission.

Again referring to FIG. 12, assuming a UE needs to select 4 physical resource blocks (PRBs) to transmit a transport block (TB) via a sidelink transmission, 4 PRBs occur earlier for TRP 2 (slots1-2) than for TRP 1 (slot 4). Thus, in this case, TRP 2 may be selected for the sidelink transmission as it has the earliest resources.

In another example, the TRP with the earliest resource that meets an exclusion criteria may be chosen (e.g., a lowest exclusion in terms of measured RSRP). For example, in a 2 TRP scenario, the RSRP-based exclusion may result in sufficient resources in slot 4 for TRP1 with an exclusion RSRP metric of −90 dBm (ex RSRP=−90 dBm) and sufficient resources in slot 3 for TRP2, but with an exclusion RSRP metric of −80 dBm (ex RSRP=−80 dBm). In such cases, even though sufficient resources are found later for TRP1 (slot4), TRP1 may be selected as those resources can be selected with a lower exclusion RSRP which increases the probability of successful transmission due to the lowering of interference.

Another approach may attempt to achieve a tradeoff between the earliest available resources and lowest exclusion RSRP. For example, within a pre-configured number of slots (e.g., a window of T=5 slots), the UE may identify the resources with a minimum RSRP. In other words, it may be acceptable to choose slightly later resources (within the 5 slot window) if they can be selected with a lower exclusion RSRP.

For example, if TRP 1 has sufficient resources at slot 3 with ex RSRP=−70 dBm, while TRP2 has sufficient resources at slot 7 with ex RSRP=−90 dBm, the UE will choose TRP2 for transmission, despite the resources occurring later because the TRP 2 resources have the lowest measured/sensed RSRP in the 5 slot window (from slots 3-7). On the other hand, if TRP 1 has sufficient resources at slot 3 with ex RSRP=−70 dBm, while TRP2 does not have sufficient resources until slot 9 with ex RSRP=−90 dBm, the UE will choose TRP1 for transmission, because the TRP 2 resources are outside the 5 slot window starting with slot 3.

In some cases, when one or a subset of TRPs are selected for transmission, the other TRP may not transmit at all. In other cases, the other TRP may be restricted to transmitting on orthogonal time frequency resources, in order to avoid interfering with the transmission of the other TRPs. In such cases, the TRP may be able to transmit with full power over the orthogonal resources (eliminating the need for power control/interference management).

In some cases, a retransmission may be sent on a different TRP than the original/first transmission. This may apply to a blind retransmission (e.g., sent automatically without feedback to improve reliability) or back to back hybrid automatic repeat request (HARQ) reTx.

Figure 13:
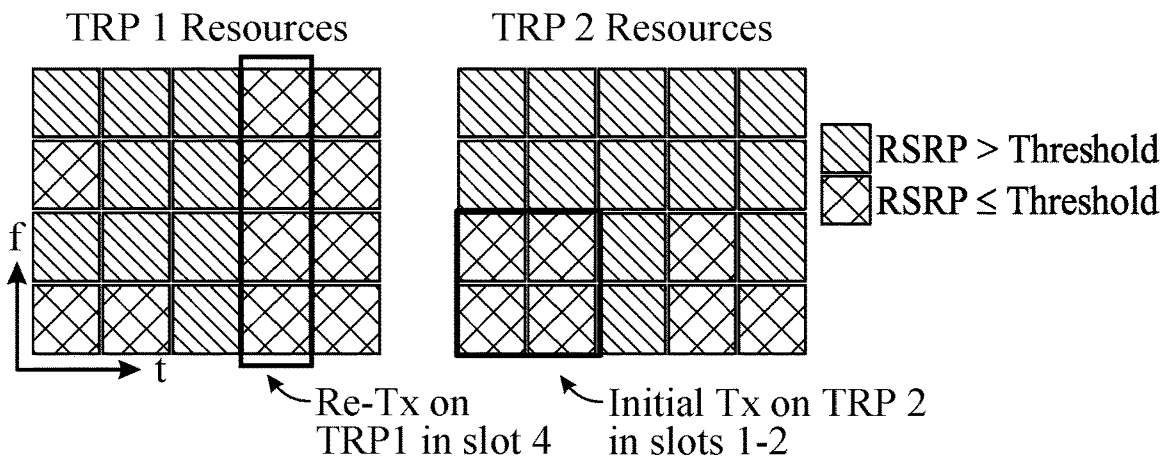

As illustrated in FIG. 13, a different TRP may be used for a retransmission when the mTRP UE determines that required resources for a retransmission may be available on a different TRP (or sets of TRPs) earlier than an initial TRP. In the illustrated example, a first transmission is sent on TRP2 (using the 4 PRBs in slots 1-2) and the retransmission sent on TRP1 (using the 4 PRBs in slot 4).

In some cases, the resource(s) reserved for retransmission by the second TRP (set of TRPs) may not be indicated in the SCI transmitted on the first TRP (set of TRPs). In such cases, other UEs may not make any resource exclusion until a next SCI is received (indicating reserved resources). In other cases, the resources may be indicated in the SCI transmitted on the first TRP and/or excluded (along with the RSRP based exclusion). In one case, the resources may be excluded based on the RSRP measured via the first TRP. In another case, an additional protection such as RSRP+x dB may be indicated in the SCI for the resources, which should be protected or excluded from being used when the measurement via the first TRP is equal to or greater than RSRP+x dB. In yet another case, the SCI may indicate that the resources are to be excluded irrespective of the RSRP (e.g., to help avoid collisions and ensure successful transmission of high priority data).

In some cases, an mTRP UE may decide to transmit on multiple TRPs simultaneously. For example, when (sufficient) transmit resources are available on both (or multiple) TRPs simultaneously, both TRPs may be used for transmission. In such cases, for a given TB, both (or multiple) TRPs may have overlapping resources available within an exclusion RSRP limit.

Figure 14:
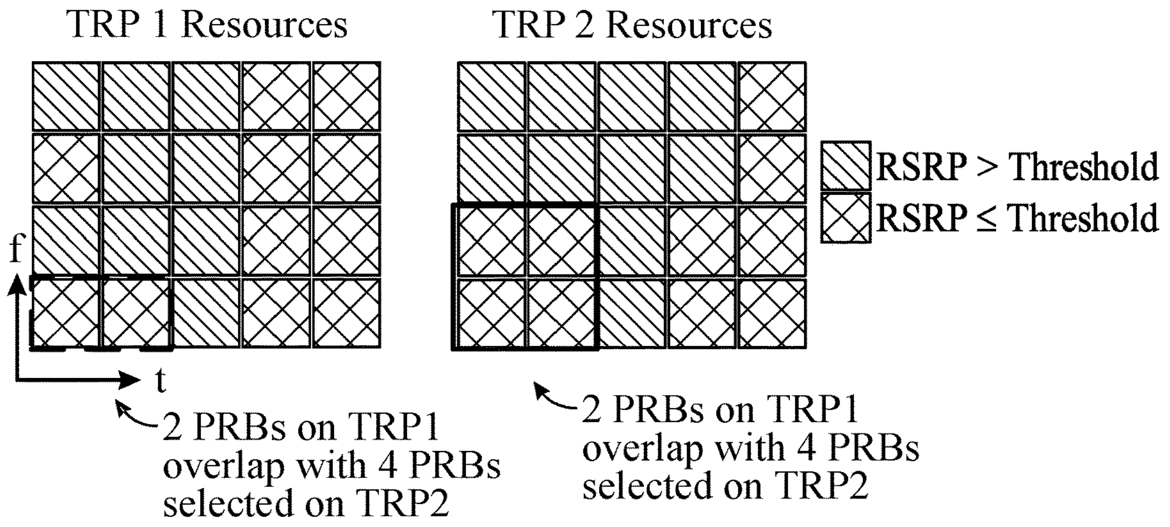

As illustrated in FIG. 14, in some cases, the total number of resources available may be different on these TRPs. In the illustrated example, 2 PRBs selected for transmission on TRP1 overlap with 4 PRBs selected for transmission on TRP 2. In such cases, both TRPs may transmit the same TB, but mapping to different MCS values (e.g., QPSK for TRP 2 and 16 QAM for TRP 1). In this case, the SCI for both of these transmissions may indicate the corresponding MCS value. In some cases, the TRPs set their transmission power and/or beam direction appropriately in an effort to minimize interference.

At the receiver UE (which may support a single TRP or multiple TRPs), in some cases, if both of the transmissions are received, the receiver UE may only decode the one with the higher SINR/SCI-RSRP and disregard the other. In other cases, the receiver UE may first decode both. For example, the receiver UE may decode the transmission with the higher MCS first and store decoded bits, the log likelihood ratio LLR values (soft bits) or both bits and LLR values if the decoding fails. The receiver may then decode the lower MCS transmission based on the stored decoded bits or the stored LLR values from the higher MCS transmission so as to enhance robustness.

Figure 15:
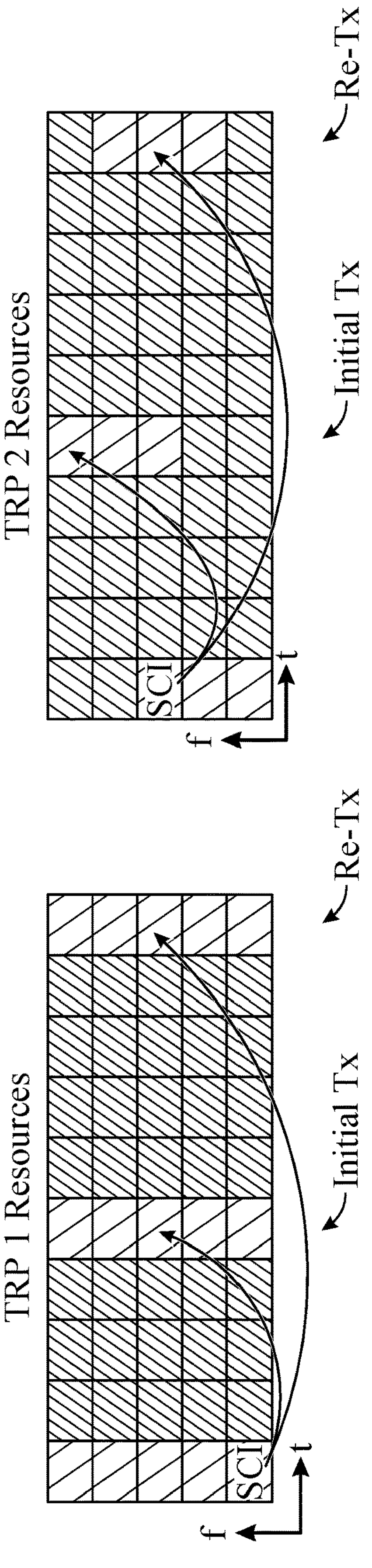
FIGS. 15-16 illustrate example of sidelink retransmission resources and indication thereof, in accordance with certain aspects of the present disclosure.

As illustrated in FIG. 15, in some cases, retransmission resources may be indicated in all SCIs (for the initial transmissions) When both TRPs find partially overlapping re-Tx resources, as in the illustrated example, these resources may be indicated in the SCIs transmitted on both TRPs. At the receiver UE, resource exclusion may be performed based on the reservation information and RSRP measured on both of the SCIs.

Figure 16:
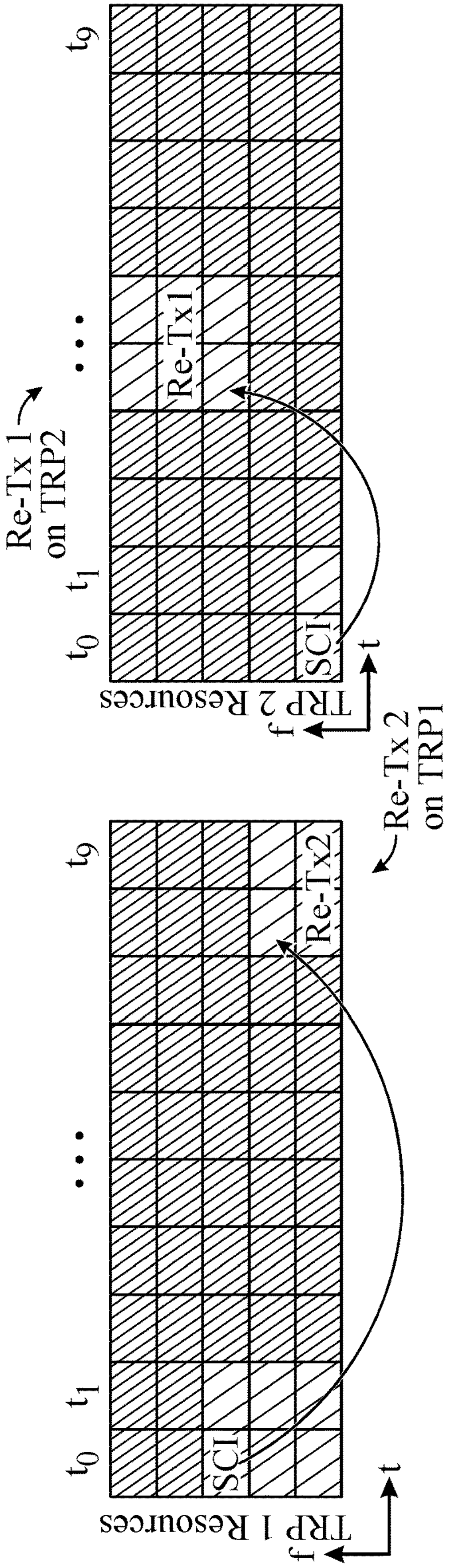

In some cases, as illustrated in FIG. 16, both TRPs may not find retransmission resources at the same location. In such cases, the mTRP UE may choose a retransmission candidate based on some criteria, such as the earlier or the largest allocation within a window. In the illustrated example, the UE chooses earlier occurring resource in TRP 2 for a first retransmission and later occurring resources in TRP 1 for a second retransmission.

As illustrated in FIG. 16, an SCI transmitted on one TRP (or set of TRPs) may indicate the retransmission resources for that TRP (or set of TRPs). In such cases, the SCIs transmitted on different TRPs may point to different retransmission resources corresponding to different re-Tx occasions (e.g., the SCI transmitted on TRP 2 points to resources for the first retransmission while the SCI transmitted on TRP 1 points to resources for the second retransmission).

At the receiver UE, the resource exclusion at these retransmissions occasions may be based on the RSRP received from the corresponding TRPs. On decoding the SCIs on the first transmission and inferring concurrent transmissions (on TRP1 and TRP2), the receiver UE may treat the retransmissions as successive retransmission.

Example Aspects

In addition to the various aspects described above, aspects of specific combinations are within the scope of the disclosure, some of which are detailed below:

Aspect 1: A method for wireless communications by a user equipment (UE), comprising: taking received signal power measurements on a first transmitter receiver point (TRP) of the UE and a second TRP of the UE; determining a set of candidate resources from a pool of resources for sidelink transmissions based on the received signal power measurements taken on the first and second TRPs; selecting resources from the set of candidate resources for sidelink communications; and transmitting on the sidelink via at least one of the first TRP or the second TRP by using the selected resources.

Aspect 2: The method of Aspect 1, wherein taking the received signal power measurements comprises taking self-interference measurements by: transmitting on the first TRP while receiving on the second TRP; and transmitting on the second TRP while receiving on the first TRP.

Aspect 3: The method of any one of Aspects 1-2, wherein: the selection of resources comprises selecting resources for sidelink transmissions on only one of the first and second TRPs; and the transmission is performed on only the one TRP.

Aspect 4: The method of Aspect 3, further comprising selecting the one TRP for transmission based on the one TRP having sufficient resources available for the transmission earlier in time than transmission of resources available for the other TRP.

Aspect 5: The method of Aspect 3, further comprising selecting the one TRP for transmission based on the one TRP having sufficient resources available for the transmission earlier than transmission by the other TRP, said sufficient resources satisfying a metric.

Aspect 6: The method of any one of Aspects 1-5, wherein: the selection of resources comprises selecting a first set of resources for transmission on the first TRP and selecting a second set of resources for transmission on the second TRP; and the transmission is performed on the first TRP via the first set of resources and on the second TRP via the second set of resources.

Aspect 7: The method of Aspect 6, wherein the first and second set of resources are orthogonal in at least one of frequency or time.

Aspect 8: The method of Aspect 6, wherein the transmission comprises: a first transmission is performed on the first TRP via the first set of resources; and a retransmission of the first transmission is performed on the second TRP via the second set of resources.

Aspect 9: The method of Aspect 8, wherein the second set of resources used for the retransmission is indicated via sidelink control information (SCI) transmitted on the first TRP.

Aspect 10: The method of Aspect 8, wherein SCI indicates that second set of resources is to be excluded by a UE receiving the SCI regardless of a measurement associated with the second set of resources.

Aspect 11: The method of Aspect 6, wherein the first and second set of resources at least partially overlap in time, frequency or time and frequency.

Aspect 12: The method of any one of Aspects 6 and 11, wherein the first set of resources has a different number of resources than the second set of resources.

Aspect 13: The method of any one of Aspects 1-12, wherein: a same transport block (TB) is transmitted on the first and second TRPs; the first TRP uses a first modulation and coding scheme (MCS) to transmit the TB via the first set of resources; and the second TRP uses a second MCS to transmit the TB via the second set of resources.

Aspect 14: The method of Aspect 13, wherein: sidelink control information (SCI) transmitted on the first TRP indicates the first MCS; and SCI transmitted on the second TRP indicates the second MCS.

Aspect 15: The method of any one of Aspects 1-14, further comprising setting at least one of transmit power or beam direction for the transmissions on the first and second TRPs based on the received signal power measurements.

Aspect 16: The method of Aspect 6 or Aspect 11 wherein the transmission comprises: a first transmission is performed on the first TRP via the first set of resources and on the second TRP via the second set of resources; and a retransmission of the first transmission is performed on the first TRP via a first set of retransmission resources and on the second TRP via a second set of retransmission resources.

Aspect 17: The method of Aspect 16, wherein: the first and second sets of retransmission resources at least partially overlap in time, frequency or time and frequency; the first set of retransmission resources is indicated via sidelink control information (SCI) transmitted on the first TRP; and the second set of retransmission resources is indicated via SCI transmitted on the second TRP.

Aspect 18: The method of Aspect 16, wherein: the first and second sets of retransmission resources occupy different time resources corresponding to different retransmission occasions; and the sidelink control informations (SCIs) transmitted on the first and second TRPs via the different retransmission resources corresponding to the different retransmission occasions.

Aspect 19: A method for wireless communications by a receiver user equipment (UE), comprising: receiving one or more sidelink control informations (SCIs) indicating resources for a sidelink transmission jointly scheduled on first and second transmitter receiver points (TRPs) of a transmitter UE; and monitoring the indicated resources for the sidelink transmission.

Aspect 20: The method of Aspect 19, wherein the one or more SCIs comprise: a first SCI indicating a first set of resources for sidelink transmission from the first TRP; and a second SCI indicating a second set of resources for sidelink transmission from the second TRP.

Aspect 21: The method of Aspect 20, further comprising: if the receiver UE receives a sidelink transmission via both the first set of resources and the second set of resources, decoding the sidelink transmission received on only one of the first and second sets of resources.

Aspect 22: The method of Aspect 20, wherein: the first and second SCIs also indicate first and second modulation and coding schemes (MCSs) used for the sidelink transmissions via the first and second sets of resources; and if the receiver UE receives a sidelink transmission on both the first set of resources and the second set of resources, the method further comprises attempting to decode the sidelink transmission sent with the higher of the first and second MCSs.

Aspect 23: The method of Aspect 22, further comprising, if the attempt to decode the sidelink transmission sent with the higher of the first and second MCS fails: storing decoded bits or logarithmic likelihood ratios (LLRs) from the failed attempt; and attempting to decode the sidelink transmission sent with the lower of the first and second MCS based on the stored decoded bits or LLRs.

Aspect 24: The method of any one of Aspects 19-23, wherein the one or more SCIs also indicate retransmission resources for a sidelink retransmission scheduled on at least one of the first TRP or the second TRP of the transmitter UE.

Aspect 25: The method of Aspect 24, further comprising determining candidate resources for sidelink transmissions based, at least in part, on the indicated retransmission resources.

Aspect 26: The method of Aspect 24, wherein: the one or more SCIs further indicate a measurement regarding a reference signal receiver power (RSRP); and the method further comprises determining candidate resources for sidelink transmissions based on the indicated retransmission resources and the indicated measurement.

Aspect 27: The method of Aspect 24, wherein: the one or more SCIs indicate first and second sets of the indicated retransmission resources from the first and second TRPs corresponding to different retransmission occasions; and the method further comprising determining resources exclusion at the different retransmission occasions based on reference signal receiver power (RSRP) measurements from the corresponding TRPs.

Aspect 28: The method of Aspect 24, wherein: the one or more SCIs indicate first and second sets of the indicated retransmission resources from the first and second TRPs corresponding to different retransmission occasions; and the method further comprises treating retransmissions via the first and second sets of the indicated retransmission resources as successive retransmissions.

Aspect 29: A user equipment (UE), comprising means for performing the operations of one or more of Aspects 1-18.

Aspect 30: A user equipment UE, comprising a transceiver and a processing system including at least one processor configured to perform the operations of one or more of Aspects 1-18.

Aspect 31: An apparatus for wireless communications by a user equipment (UE), comprising: a processing system configured to take received signal power measurements on a first transmitter receiver point (TRP) of the UE and a second TRP of the UE, determine resources to exclude from a pool of resources for sidelink transmissions based on the received signal power measurements taken on the first and second TRPs, and select resources from the pool of resources for sidelink communications based at least in part on the determination of resources to exclude; and an interface configured to output data for transmission on the sidelink via one or more of the first and second TRPs by using the selected resources.

Aspect 32: A computer-readable medium for wireless communications, comprising codes executable by an apparatus to: take received signal power measurements on a first transmitter receiver point (TRP) of the UE and a second TRP of the UE; determine resources to exclude from a pool of resources for sidelink transmissions based on the received signal power measurements taken on the first and second TRPs; select resources from the pool of resources for sidelink communications based at least in part on the determination of resources to exclude; and transmit on the sidelink via one or more of the first and second TRPs by using the selected resources.

Aspect 33: A receiver user equipment (UE), comprising means for performing the operations of one or more of Aspects 19-28.

Aspect 34: A receiver user equipment UE, comprising a transceiver and a processing system including at least one processor configured to perform the operations of one or more of Aspects 19-28.

Aspect 35: An apparatus for wireless communications by a receiver user equipment (UE), comprising: an interface configured to obtain one or more sidelink control informations (SCIs) indicating resources for a sidelink transmission jointly scheduled on first and second transmitter receiver points (TRPs) of a transmitter UE; and a processing system configured to monitor the indicated resources for the sidelink transmission.

Aspect 36: A computer-readable medium for wireless communications, comprising codes executable by an apparatus to: obtain one or more sidelink control informations (SCIs) indicating resources for a sidelink transmission jointly scheduled on first and second transmitter receiver points (TRPs) of a transmitter UE; and monitor the indicated resources for the sidelink transmission.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term “determining” encompasses a wide variety of actions. For example, “determining” may include calculating, computing, processing, deriving, investigating, looking up (e.g., looking up in a table, a database or another data structure), ascertaining and the like. Also, “determining” may include receiving (e.g., receiving information), accessing (e.g., accessing data in a memory) and the like. Also, “determining” may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean “one and only one” unless specifically so stated, but rather “one or more.” Unless specifically stated otherwise, the term “some” refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase “means for” or, in the case of a method claim, the element is recited using the phrase “step for.”

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 10 and 11 may be performed by various processors shown in FIG. 4, such as processors 466, 458, 464, and/or controller/processor 480 of the UE 120*a*.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for taking received signal power measurements, means for determining, means for selecting, means for taking self-interference measurements, means for monitoring, means for decoding, means for attempting, means for storing, means for treating retransmissions, and means for setting may include a processing system, which may include one or more processors, such as processors 458, 464 and 466, and/or controller/processor 480 of the UE 120*a* and/or processors 420, 430, 438, and/or controller/processor 440 of the BS 110*a* shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:

transmitting on a first transmitter receiver point (TRP) while receiving on a second TRP;

transmitting on the second TRP while receiving on the first TRP, wherein the transmissions on the first TRP and the second TRP are used to identify received signal power measurements, the received signal power measurements including self-interference measurements for the first TRP and the second TRP;

determining, for at least the first TRP, a set of candidate resources from a pool of resources for sidelink transmissions based on the received signal power measurements identified for the first and second TRPs including the self-interference measurements for the first TRP and the self-interference measurements for the second TRP;

selecting one of the first TRP or the second TRP for transmission based on the one of the first TRP or the second TRP having sufficient resources available for transmission earlier in time than another one of the first TRP or the second TRP;

selecting, for the one of the first TRP or the second TRP, resources from the set of candidate resources for sidelink communications; and transmitting on the sidelink via the one of the first TRP or the second TRP by using the selected resources, wherein transmitting on the sidelink includes performing a first retransmission of data via the one of the first TRP or the second TRP having the sufficient resources available for transmission earlier in time and performing a second retransmission of the data via the other one of the first TRP or the second TRP, the second retransmission being during a different retransmission occasion than the first retransmission.

2. The method of claim 1, wherein:

the selection of resources comprises selecting the first set of resources for transmission on the first TRP and selecting the second set of resources for transmission on the second TRP; and the transmission is performed on the first TRP via the first set of resources and one the second TRP via the second set of resources.

3. The method of claim 2, wherein the transmission comprises:

a first transmission is performed on the first TRP via the first set of resources and on the second TRP via the second set of resources; and a retransmission of the first transmission is performed on the first TRP via a first set of retransmission resources and on the second TRP via a second set of retransmission resources.

4. The method of claim 3, wherein:

the first and second sets of retransmission resources at least partially overlap in time, frequency or time and frequency;

the first set of retransmission resources is indicated via sidelink control information (SCI) transmitted on the first TRP; and the second set of retransmission resources is indicated via SCI transmitted on the second TRP.

5. The method of claim 3, wherein:

the first and second sets of retransmission resources occupy different time resources corresponding to the different retransmission occasions; and the first and second sets of retransmission resources are indicated via sidelink control informations (SCIs) transmitted on the first and second TRPs via the different retransmission resources corresponding to the different retransmission occasions.

6. The method of claim 2, wherein:

a same transport block (TB) is transmitted on the first and second TRPs;

the first TRP uses a first modulation and coding scheme (MCS) to transmit the TB via the first set of resources; and the second TRP uses a second MCS to transmit the TB via the second set of resources.

7. The method of claim 6, wherein:

sidelink control information (SCI) transmitted on the first TRP indicates the first MCS; and SCI transmitted on the second TRP indicates the second MCS.

8. The method of claim 2, wherein the first and second set of resources are orthogonal in at least one of frequency or time.

9. The method of claim 2, wherein the second set of resources used for the retransmission is indicated via sidelink control information (SCI) transmitted on the first TRP.

10. The method of claim 2, wherein SCI indicates that second set of resources is to be excluded by a UE receiving the SCI regardless of a measurement associated with the second set of resources.

11. The method of claim 2, wherein the first and second set of resources at least partially overlap in time and frequency.

12. The method of claim 2, wherein the first set of resources has a different number of resources than the second set of resources.

13. The method of claim 2, wherein the transmission comprises:

a first transmission is performed on the first TRP via the first set of resources; and a retransmission of the first transmission is performed on the second TRP via the second set of resources.

14. The method of claim 1, wherein the one of the first TRP or the second TRP for transmission is selected further based on said sufficient resources satisfying a metric.

15. The method of claim 1, further comprising setting at least one of transmit power or beam direction for the transmissions on the first and second TRPs based on the received signal power measurements.

16. The method of claim 1, wherein the selected resources comprise time and frequency resources.

17. A method for wireless communications by a receiver user equipment (UE), comprising:

receiving one or more sidelink control informations (SCIs) indicating resources for a sidelink transmission jointly scheduled on first and second transmitter receiver points (TRPs) of a transmitter UE, wherein the one or more SCIs comprise a first SCI indicating a first set of resources for a retransmission, via the first TRP, for the sidelink transmission and a second SCI indicating a second set of resources for a retransmission, via the second TRP, for the sidelink transmission, the first set of resources being different than the second set of resources, wherein the first SCI indicates resources for a first retransmission of data via one of the first TRP or the second TRP based on the one of the first TRP or the second TRP having sufficient resources available for transmission earlier in time than another one of the first TRP or the second TRP, and wherein the second SCI indicates resources for a second retransmission of the data via the other one of the first TRP or the second TRP, the second retransmission being during a different retransmission occasion than the first retransmission; and monitoring the indicated resources for the sidelink transmission, wherein the sidelink transmission is a joint transmission by the first TRP and the second TRP for the receiver UE, and wherein the joint transmission comprises simultaneous transmission using the first TRP and the second TRP.

18. The method of claim 17, wherein the one or more SCIs also indicate retransmission resources for a sidelink retransmission scheduled on at least one of the first TRP or the second TRP of the transmitter UE.

19. The method of claim 18, further comprising determining candidate resources for sidelink transmissions based, at least in part, on the indicated retransmission resources.

20. The method of claim 18, wherein:

the one or more SCIs further indicate a measurement regarding a reference signal receiver power (RSRP); and the method further comprises determining candidate resources for sidelink transmissions based on the indicated retransmission resources and the indicated measurement.

21. The method of claim 18, wherein:

the one or more SCIs indicate first and second sets of the indicated retransmission resources from the first and second TRPs corresponding to the different retransmission occasions; and the method further comprising determining resources exclusion at the different retransmission occasions based on reference signal receiver power (RSRP) measurements from the corresponding TRPs.

22. The method of claim 18, wherein:

the one or more SCIs indicate first and second sets of the indicated retransmission resources from the first and second TRPs corresponding to the different retransmission occasions; and the method further comprises treating retransmissions via the first and second sets of the indicated retransmission resources as successive retransmissions.

23. The method of claim 17, wherein:

the first and second SCIs also indicate first and second modulation and coding schemes (MCSs) used for the sidelink transmissions via the first and second sets of resources; and if the receiver UE receives a sidelink transmission on both the first set of resources and the second set of resources, the method further comprises attempting to decode the sidelink transmission sent with the higher of the first and second MCSs.

24. The method of claim 23, further comprising, if the attempt to decode the sidelink transmission sent with the higher of the first and second MCS fails:

storing decoded bits or logarithmic likelihood ratios (LLRs) from the failed attempt; and attempting to decode the sidelink transmission sent with the lower of the first and second MCS based on the stored decoded bits or LLRs.

25. The method of claim 17, further comprising:

if the receiver UE receives a sidelink transmission via both the first set of resources and the second set of resources, decoding the sidelink transmission received on only one of the first and second sets of resources.

26. A user equipment (UE), comprising:

a transmitter configured to:

transmit on a first transmitter receiver point (TRP) while receiving on a second TRP; and transmit on the second TRP while receiving on the first TRP, wherein the transmissions on the first TRP and the second TRP are used to identify received signal power measurements, the received signal power measurements including self-interference measurements for the first TRP and the second TRP; and a processing system configured to:

determine, for at least the first TRP, a set of candidate resources from a pool of resources for sidelink transmissions based on the received signal power measurements identified for the first and second TRPs including the self-interference measurements for the first TRP and the self-interference measurements for the second TRP;

select one of the first TRP or the second TRP for transmission based on the one of the first TRP or the second TRP having sufficient resources available for transmission earlier in time than another one of the first TRP or the second TRP; and select, for the one of the first TRP or the second TRP, resources from the set of candidate resources for sidelink communications, wherein the transmitter is further configured to transmit on the sidelink via the one of the first TRP or the second TRP by using the selected resources, wherein, to transmit on the sidelink, the transmitter is configured to perform a first retransmission of data via the one of the first TRP or the second TRP having the sufficient resources available for transmission earlier in time and perform a second retransmission of the data via the other one of the first TRP or the second TRP, the second retransmission being during a different retransmission occasion than the first retransmission.

27. The UE of claim 26, wherein the selected resources comprise time and frequency resources.

28. A receiver user equipment (UE), comprising:

a receiver configured to receive one or more sidelink control informations (SCIs) indicating resources for a sidelink transmission jointly scheduled on first and second transmitter receiver points (TRPs) of a transmitter UE, wherein the one or more SCIs comprise a first SCI indicating a first set of resources for a retransmission, via the first TRP, for the sidelink transmission and a second SCI indicating a second set of resources for a retransmission, via the second TRP, for the sidelink transmission, the first set of resources being different than the second set of resources, wherein the first SCI indicates resources for a first retransmission of data via one of the first TRP or the second TRP based on the one of the first TRP or the second TRP having sufficient resources available for transmission earlier in time than another one of the first TRP or the second TRP, and wherein the second SCI indicates resources for a second retransmission of the data via the other one of the first TRP or the second TRP, the second retransmission being during a different retransmission occasion than the first retransmission; and a processing system configured to monitor the indicated resources for the sidelink transmission, wherein the sidelink transmission is a joint transmission by the first TRP and the second TRP for the receiver UE, and wherein the joint transmission comprises simultaneous transmission using the first TRP and the second TRP.

* * * * *